United States Patent
Lin (10) Patent No.: US 9,322,978 B2
(45) Date of Patent: Apr. 26, 2016

(54) PLASTIC FRAME, DISPLAY HAVING THE SAME AND METHOD FOR MANUFACTURING THE PLASTIC FRAME

(71) Applicant: Wistron Corporation, New Taipei (TW)

(72) Inventor: Yi-Hsin Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 112 days.

(21) Appl. No.: 14/455,308

(22) Filed: Aug. 8, 2014

(65) Prior Publication Data

US 2015/0301263 A1   Oct. 22, 2015

(30) Foreign Application Priority Data

Apr. 17, 2014   (CN) .......................... 2014 1 0155099

(51) Int. Cl.
*F21V 7/04* (2006.01)
*F21V 8/00* (2006.01)
*G02F 1/1335* (2006.01)

(52) U.S. Cl.
CPC ............ *G02B 6/0046* (2013.01); *G02F 1/1336* (2013.01)

(58) Field of Classification Search
CPC .. G02B 6/0013; G02B 6/0023; G02B 6/0045; G02B 6/0046; G02B 6/0086; G02B 6/0088; G02B 6/009; G02B 6/0091; G02B 6/0095; G02F 1/1336; G02F 1/133615

USPC ............ 362/608, 610, 612, 632–634; 349/58, 349/65

See application file for complete search history.

(56) References Cited

U.S. PATENT DOCUMENTS

2007/0030699 A1   2/2007   Tseng et al.
2013/0141935 A1   6/2013   Huang

FOREIGN PATENT DOCUMENTS

TW   20070707003 A   2/2007
TW   201323946 A1   6/2013

*Primary Examiner* — Jason Moon Han
(74) *Attorney, Agent, or Firm* — Muncy, Geissler, Olds & Lowe, P.C.

(57) ABSTRACT

A plastic frame, a display having the same and a method for manufacturing the plastic frame are disclosed, wherein the display has a display module and a backlight module. The display module connects to the backlight module, and the backlight module has a light guiding plate, illuminating elements, and a plastic frame. The plastic frame has a frame body and a light guiding element. The frame body is made of plastics and the light guiding plate and the illuminating elements are accommodated therein. The light guiding element has a first end and a second end, is made of light optically transmissive material, and is integrally formed. The height of the first end is H1 and the height of the second end is H2, wherein H1>H2, and the light guiding plate is disposed near the second end.

12 Claims, 8 Drawing Sheets

PLASTIC FRAME, DISPLAY HAVING THE SAME AND METHOD FOR MANUFACTURING THE PLASTIC FRAME

BACKGROUND OF THE DISCLOSURE

1. Field of the Disclosure

The present disclosure relates to a plastic frame, a display, and a method for manufacturing the plastic frame, and more particularly to a light guiding element of the plastic frame and display manufactured through a co-injection molding process, and the method for manufacturing the plastic frame to eliminate a height difference between a light guiding plate and an illuminating element.

2. Description of the Related Art

As technology develops, the majority of electronic devices are designed to be thin and light. In order to meet design trends for electronic devices, one being that laptops, tablets or smart phones must be thin and light, displays disposed in such electronic devices also have to be thin. For example, the backlight module of the display has to provide adequate and even lighting for the LCD panel because the LCD panel of an LCD display does not illuminate itself. Generally speaking, the backlight modules of LCD displays are composed of illuminating elements (such as LEDs), a light guiding plate (such as a light guide plate), a frame, etc. Light emitted from the illuminating elements enters the light guiding plate, and then the light is guided and evenly distributed into a planar light source by the light guiding plate. After the light has been evenly distributed and concentrated, the light is emitted into the LCD panel.

Hereinafter, a tablet with a 7-inch display is used as an example. The backlight module of the 7-inch display conventionally applies LEDs having a height of 0.6 mm as illuminating elements. The height of an end of a light guiding plate that connects with the LEDs is consequently increased to match the height of the LEDs such that light leakage is prevented and the utilization of lights is also enhanced. However, increasing the height of only one end of the light guiding plate may cause the entire shape of the light guiding plate to be irregular, and this irregularity accordingly increases the costs of design, manufacturing, and assembly. Therefore, it is necessary to improve the structure of the backlight module such that the frame body of the backlight module is capable of preventing light leakage, and such that the shape of the light guiding plate is regular to facilitate manufacturing.

SUMMARY OF THE DISCLOSURE

It is an object of the present disclosure to provide a plastic frame formed through a co-injection molding process, wherein a light guiding element is disposed in the plastic frame to eliminate a height difference between the illuminating element and the light guiding plate.

It is another object of the present disclosure to provide a backlight module with the abovementioned plastic frame.

It is still other object of the present disclosure to provide a display with the abovementioned plastic frame.

It is further another object of the present disclosure to provide a method for manufacturing the abovementioned plastic frame.

To achieve the aforementioned objects, the display of the present disclosure comprises a display module and a backlight module, wherein the backlight module connects to the display module. The backlight module comprises a light guiding plate, an illuminating element, and a plastic frame. The plastic frame comprises a frame body and a light guiding element, wherein the frame body is made of a plastic material and the light guiding plate is accommodated therein. The light guiding element is made of an optically transmissive material and integrally combined with the frame body. The light guiding element comprises a first end and a second end. The first end has a first height H1, and the illuminating elements are situated near the first end. The second end is opposite to the first end and has a second height H2 for eliminating a height difference between the illuminating elements and the light guiding plate, wherein H1>H2 and the light guiding plate is situated near the second end.

The present disclosure further provides a plastic frame for the backlight module of a display. The plastic frame comprises a frame body and a light guiding element. The frame body is made of a plastic material, and the light guiding element is made of an optically transmissive material and is integrally combined with the frame body. The light guiding element comprises a first end and a second end opposite to the first end. The first end has a first height H1 and the second end has a second height H2, wherein H1>H2.

The present disclosure further provides a method for manufacturing the plastic frame, the method comprising the following steps: forming a frame body and a light guiding element from a plastic material and an optically transmissive material respectively through a co-injection molding process, and combining the frame body with the light guiding element to form the plastic frame through the co-injection molding process.

Through the application of the co-injection molding process, the light guiding element is integrally combined with the frame body when the plastic frame is manufactured. Furthermore, the height difference between the light guiding plate and the illuminating elements can also be eliminated. Thus, the procedure of designing and manufacturing the light guiding plate is simplified, and both assembly steps and manufacturing costs are reduced accordingly.

BRIEF DESCRIPTION OF THE DRAWINGS

The exemplary embodiment of the present disclosure will be understood more fully from the detailed description given below and from the accompanying drawings of the disclosure, which, however, should not be taken to limit the disclosure to the specific embodiment, but are for explanation and understanding only.

DETAILED DESCRIPTION OF THE PREFERRED EMBODIMENT

To facilitate understanding and to clarify the object, characteristics, and advantages of the present disclosure, the following three specific embodiments and figures illustrating the present disclosure are presented as a detailed description.

Figure 1:
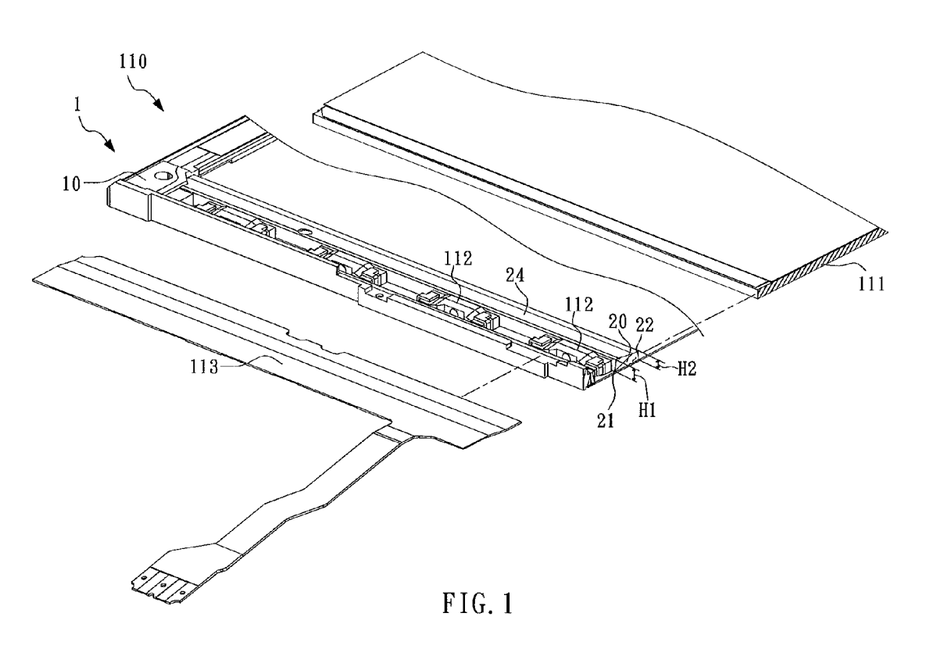
FIG. 1 is an exploded perspective view of the first embodiment of the plastic frame and the light guiding element.
Figure 2:
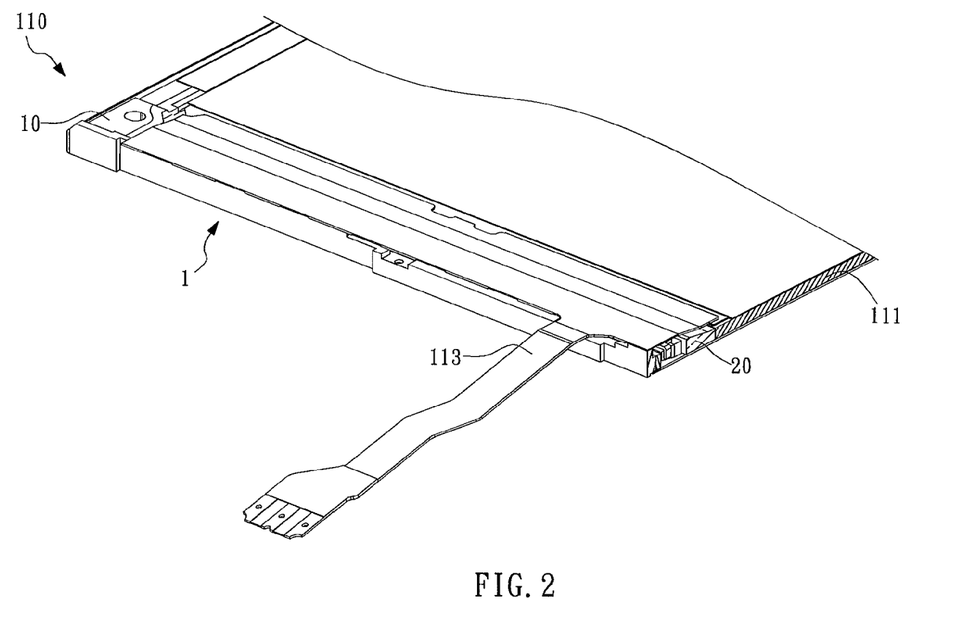
FIG. 2 is a schematic drawing illustrating the first embodiment of the plastic frame and the light guiding element.

Please refer to FIG. 1 and FIG. 2, wherein FIG. 1 is a exploded perspective view of the first embodiment of the plastic frame and the light guiding element, and FIG. 2 is a schematic drawing illustrating the first embodiment of the plastic frame and the light guiding element.

As shown in FIG. 1, a plastic frame 1 of the present disclosure is applied to a backlight module 110 of a display. According to a preferred embodiment of the present disclosure, the plastic frame 1 of the present disclosure is mainly applied to 7-inch displays or displays having a size of less than 7 inches. In addition to the backlight module 110, the display further comprises a display module. It is noted that the display can be a liquid crystal display and that the size of the display is not limited to the abovementioned sizes. In addition, because the display and the display module are not the improved part of the present disclosure and the mechanisms of the display and the display module are also a known art, there is no need to describe their structures in detail.

As shown in FIG. 1, in the present embodiment, the backlight module 110 comprises a plastic frame 1, a light guiding plate 111, and a plurality of illuminating elements 112, wherein the illuminating elements 112 of the present embodiment are LEDs; however, the present disclosure is not limited to this. The illuminating elements 112 are configured to match the size of the backlight module 110, and the number of illuminating elements 112 can be single or plural. In the present embodiment, the height of the illuminating elements 112 is 0.6 mm, which is a regular specification applied to the displays of portable devices. However, the present disclosure is not limited to the above-mentioned embodiment. The height of the illuminating elements 112 can also be 0.8 mm. Given a height of the illuminating elements 112 of 0.6 mm and a height of the light guiding plate 111 of 0.4 mm, the height difference between the illuminating elements 112 and the light guiding plate 111 is 0.2 mm.

As shown in FIG. 1, the plastic frame 1 of the present disclosure comprises a frame body 10 and a light guiding element 20, wherein the frame body 10 and the light guiding element 20 are integrally combined with each other through the co-injection molding process to form the plastic frame 1 of the present disclosure. The frame body 10 is made of a plastic material such as Polycarbonate (PC). The light guiding element 20 is made of an optically transmissive material such as transparent plastics, PMMA (polymethylmethacrylate), or PC (Polycarbonate). The illuminating elements 112 are disposed at one side of the frame body 10. The light guiding element 20 can be disposed between the light guiding plate 111 and the plurality of the illuminating elements 112 or situated on the light guiding plate 111 near the illuminating elements 112 to eliminate the height difference between the light guiding plate 111 and the illuminating elements 112. In the present disclosure, while the backlight module 110 is being assembled, the light guiding plate 111 can be placed directly in the frame body 10. For reinforcing the light guiding plate 111, an engagement mechanism can be applied to the interior part of the frame body 1. It is noted that the engagement mechanism between the frame body 10 and the light guiding plate 111 is not the improved part of the present disclosure and that the engagement mechanism is also a known art, so there is no need to describe the structure in detail.

As shown in FIG. 1, the light guiding element 20 of the present embodiment comprises a first end 21, a second end 22, and an upper surface 24, wherein the first end 21 has a first height H1 and all the illuminating elements 112 are disposed near the first end 21. The light guiding element 20 of the present embodiment is wedged-shaped, and the height of the first height H1 matches the height of the illuminating elements 112 to prevent light leakage, such that all light emitted from the illuminating elements 112 is guided to the light guiding plate 111. The second end 22 is opposite to the first end 21 and has a second height H2, wherein H1>H2, to eliminate the height difference between the illuminating elements 112 and the light guiding plate 111.

In the present embodiment, the first height H1 and the height of the illuminating elements 112 are both 0.6 mm; however, the present disclosure is not limited to this. The first height H1 has a range of 0.2 mm≤H1≤1 cm. Furthermore, the light guiding plate 111 of the present embodiment is disposed near the second end 22, and the second height H2 of the present embodiment matches the height of the light guiding plate 111. The second height H2 is about 0.4 mm, but the present disclosure is not limited to this embodiment. In fact, there is no specific restriction in terms of the height of the first height H1 and the second height H2, as long as the height of the light guiding element 20 is sufficient to eliminate the height difference between the illuminating elements 112 and the light guiding plate 111 to prevent light leakage.

As shown in FIG. 2, when the backlight module 110 of the present embodiment is being assembled, the flexible printed circuit board 113 of the backlight module 110 can be placed directly on the upper surface 24 of the light guiding element 20 without contacting the light guiding plate 111. Therefore, when the flexible printed circuit board 113 needs to be repaired or replaced, the flexible printed circuit board 113 can be removed directly from the upper surface 24; i.e., the task can be accomplished without the user touching the light guiding plate 111. As a result, the display or backlight module 110 can be repaired in a simplified procedure with low risk of damaging the light guiding plate 111.

Figure 3:
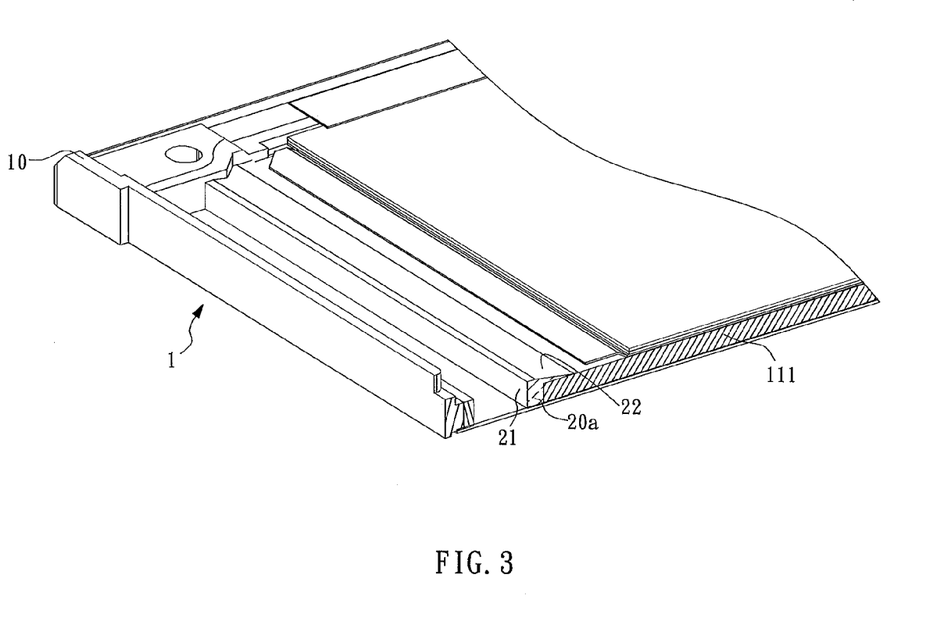
FIG. 3 is a schematic drawing illustrating the second embodiment of the plastic frame and the light guiding element.
Figure 4:
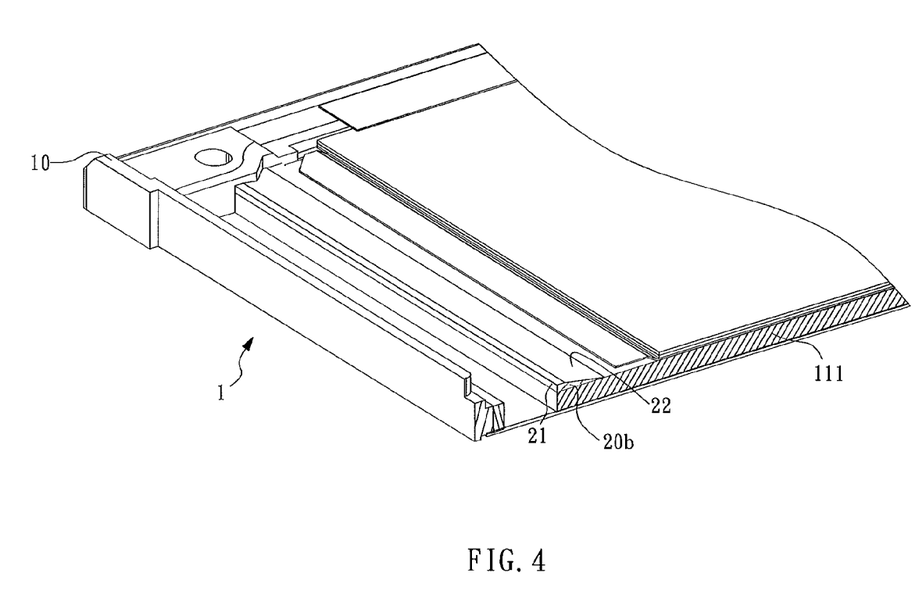
FIG. 4 is a schematic drawing illustrating the third embodiment of the plastic frame and the light guiding element.

Please refer to FIG. 3 and FIG. 4, wherein FIG. 3 is a schematic drawing illustrating the second embodiment of the plastic frame and the light guiding element, and FIG. 4 is a schematic drawing illustrating the third embodiment of the plastic frame and the light guiding element.

In order to meet the various requirements of displays of different sizes and various sizes and formats of light guiding plates 111, the light guiding element 20 provides various modifications. As shown in FIG. 3, an L-shaped light guiding element 20a is provided to make the height of the light guiding plate 111 equal to or less than 0.4 mm. Furthermore, the second end 22 of the light guiding element 20a is situated above the light guiding plate 111 near the illuminating elements 112 for eliminating the height difference between the illuminating elements 112 and the light guiding plate 111.

As shown in FIG. 4, the pyramid-shaped light guiding element 20b provided for the inner space of the display is insufficient or narrow. In addition, the entire light guiding element 20b, comprising the first end 21 and the second end 22, is situated above the light guiding plate 111 near the illuminating elements 112 for eliminating the height difference between the illuminating elements 112 and the light guiding plate 111.

Figure 5:
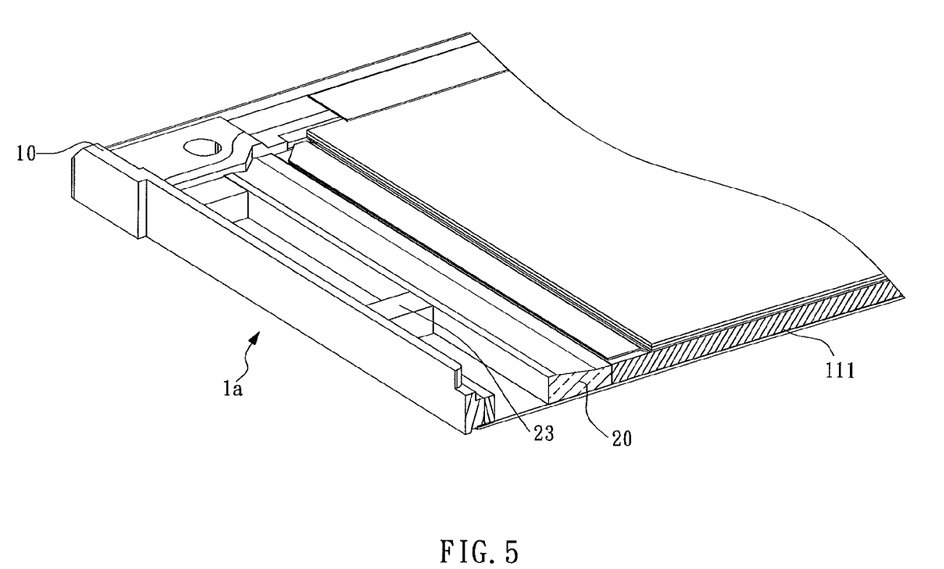
FIG. 5 is a schematic drawing illustrating the first embodiment of the light guiding element combined with the auxiliary element.
Figure 6:
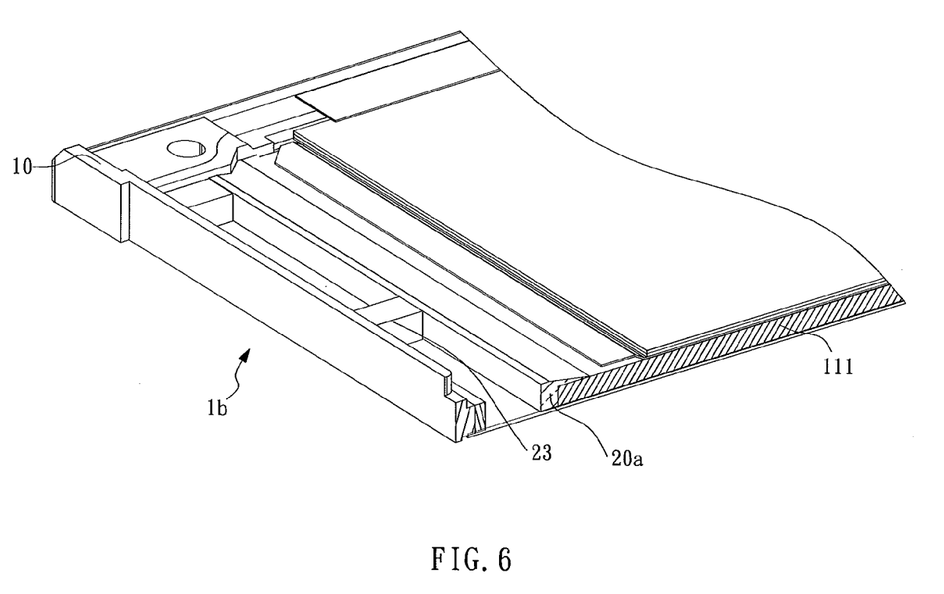
FIG. 6 is a schematic drawing illustrating the second embodiment of light guiding element combined with the auxiliary element.
Figure 7:
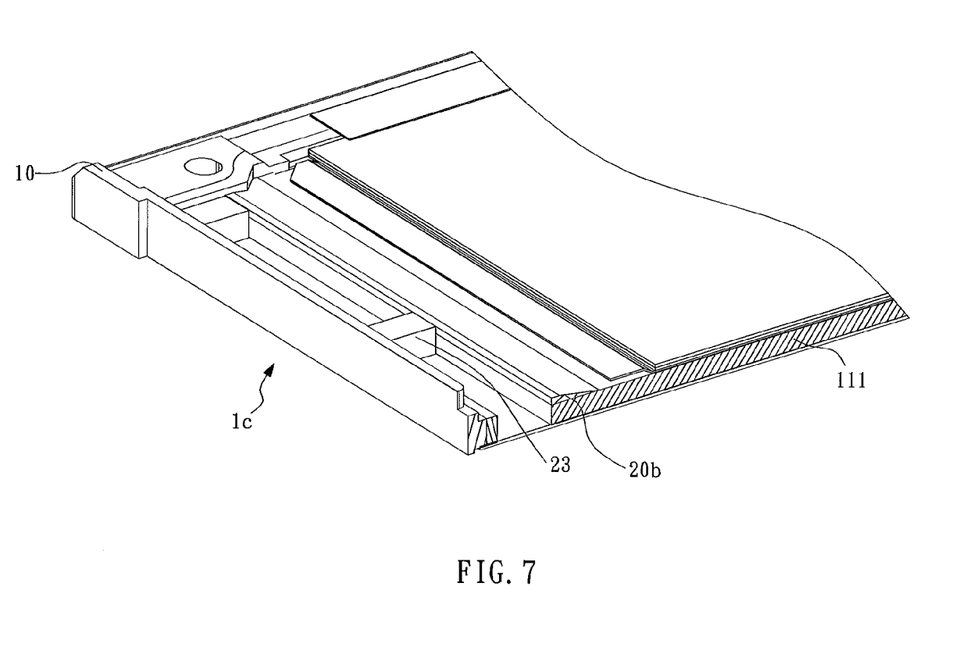
FIG. 7 is a schematic drawing illustrating the third embodiment of the light guiding element combined with the auxiliary element.

Please refer FIG. 5 to FIG. 7, wherein FIG. 5 is a schematic drawing illustrating the first embodiment of the light guiding element combined with the auxiliary element; FIG. 6 is a schematic drawing illustrating the second embodiment of the light guiding element combined with the auxiliary element; FIG. 7 is a schematic drawing illustrating the third embodiment of the light guiding element combined with the auxiliary element.

As shown in FIG. 5, in the present embodiment, the light guiding element 20 further comprises an auxiliary element 23 situated between the first end 21 and the illuminating elements 112. The auxiliary element 23 is mainly employed for enhancing the fixture of the light guiding element 20, and there is no specific requirement in terms of the shape or size of the auxiliary element 23. In the present embodiment, the auxiliary element 23 is a plurality of walls that are parallel to each other, and each of the walls is perpendicular to the first end 21 such that the plastic frame 1a is formed consequently. It is noted that, as shown in FIG. 5 to FIG. 7, the auxiliary element 23 can be applied together with various modifications of the light guiding elements 20, 20a, 20b to form the plastic frame 1a, 1b, 1c.

Through manufacturing the plastic frame 1, 1a, 1b, 1c with the co-injection molding process, the light guiding element 20, 20a, 20b can be combined with the frame body 10 first to eliminate the height difference between the illuminating elements 112 and the light guiding plate 111, such that the light guiding plate 111 can be flattened. Therefore, there is no irregular structure in the entire light guiding plate 111, which is conducive to mass production, and the costs of manufacturing elements of displays can be reduced accordingly.

Figure 8:
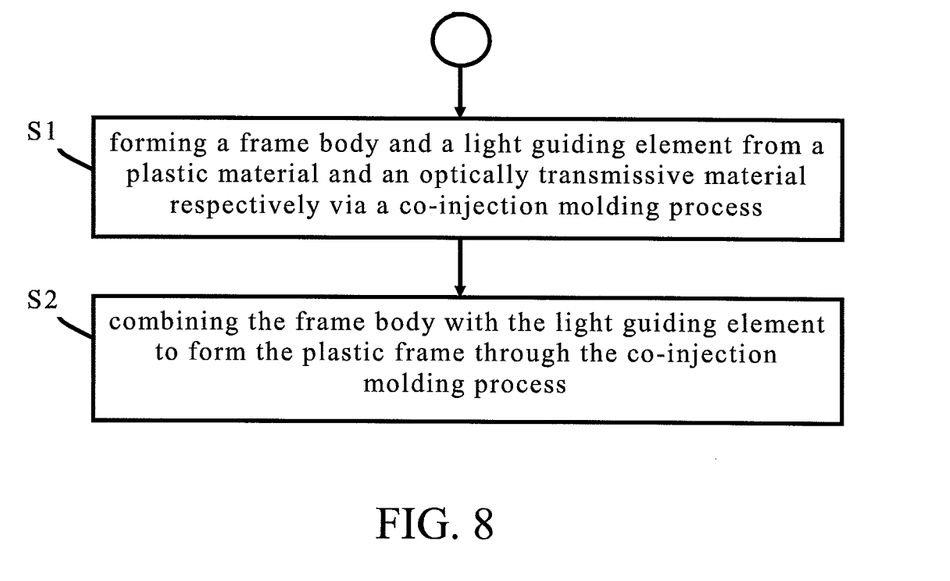
FIG. 8 is a flow chart of one embodiment of the method for manufacturing the plastic frame.

Please refer to FIG. 8, wherein FIG. 8 is a flow chart of one embodiment of the method for manufacturing the plastic frame. The plastic frame 1 manufactured via by the method for manufacturing the plastic frame of the present disclosure is mainly provided for displays with sizes of 7 inches or less. The method for manufacturing the plastic frame comprises Step S1 and Step S2. Detailed descriptions of each step are presented as follows:

Step S1: forming a frame body and a light guiding element from a plastic material and an optically transmissive material respectively by using a co-injection molding process.

The plastic material and the optically transmissive material are placed separately into injection tubes, wherein the plastic material is used to form the frame body 10 and the optically transmissive material is used to form the light guiding element 20. The plastic material of the present embodiment is PC (Polycarbonate), and the optically transmissive material is a transparent plastic, PMMA (polymethylmethacrylate), or PC (Polycarbonate).

Step S2: combining the frame body with the light guiding element to form the plastic frame by using the co-injection molding process.

During the co-injection molding process, the injection tubes separately loaded with the plastic material and the optically transmissive material can inject the materials into a forming mold at the same time or in turns, such that the frame body 10 is combined with the light guiding element 20 integrally and the plastic frame 1 manufacturing procedure is completed consequently. Furthermore, the light guiding element 20 manufactured by the co-injection molding process comprises a first end 21 and a second end 22, wherein the first end 21 has a first height H1 and a second end 22 opposite to the first end 21. The second end 22 has a second height H2, wherein H1>H2, for eliminating the height difference between the illuminating elements 112 and the light guiding plate 111 of the backlight module 110 of display.

It is noted that the above-mentioned embodiments are only for illustration. It is intended that the present disclosure cover modifications and variations of this disclosure provided they fall within the scope of the following claims and their equivalents. Therefore, it will be apparent to those skilled in the art that various modifications and variations can be made to the structure of the present disclosure without departing from the scope or spirit of the disclosure.

What is claimed is:

1. A display comprising:
   a display module;
   a backlight module connecting to the display module, the backlight module comprising a light guiding plate, at least one illuminating element, and a plastic frame, wherein the plastic frame comprises:
      a frame body, made of a plastic material, for accommodating the light guiding plate around a perimeter thereof and the at least one illuminating element;
      a light guiding element made of an optically transmissive material and integrally a part of the frame body, the light guiding element comprising:
         a first end with a first height H1 and the at least one illuminating element situated at the first end; and
         a second end, which is opposite to the first end and has a second height H2 for eliminating a height difference between the at least one illuminating element and the light guiding plate, wherein H1>H2 and the light guiding plate is situated at the second end.

2. The display as claimed in claim 1, wherein the first height H1 has a range of 0.2 mm≤H1≤1 cm.

3. The display as claimed in claim 2, wherein the backlight module further comprises a flexible printed circuit board and the light guiding element comprises an upper surface, wherein the flexible printed circuit board is disposed on the upper surface.

4. The display as claimed in claim 2, wherein the light guiding element is wedged-shaped, L-shaped, or pyramid-shaped.

5. The display as claimed in claim 3, wherein the backlight module further comprises a flexible printed circuit board and the light guiding element comprises an upper surface, wherein the flexible printed circuit board is disposed on the upper surface.

6. The display as claimed in claim 3, the light guiding element further comprising an auxiliary element situated between the first end and the at least one illuminating element.

7. The display as claimed in claim 4, wherein the backlight module further comprises a flexible printed circuit board and the light guiding element comprises an upper surface, wherein the flexible printed circuit board is disposed on the upper surface.

8. The display as claimed in claim 1, wherein the backlight module further comprises a flexible printed circuit board and the light guiding element comprises an upper surface, wherein the flexible printed circuit board is disposed on the upper surface.

9. A plastic frame comprising:
   a frame body for surrounding a perimeter of a light guiding plate and made of a plastic material; and
   a light guiding element installed between the light guiding plate and at least one illuminating element and made of an optically transmissive material that is integrally a part of the frame body, wherein the light guiding element comprises a first end and a second end opposite to the first end, the first end having a first height H1 and the second end having a second height H2, wherein H1>H2.

10. The plastic frame as claimed in claim 9, wherein the first height H1 has a range of 0.2 mm≤H1≤1 cm.

11. The plastic frame as claimed in claim 10, wherein the light guiding element is wedged-shaped, L-shaped, or pyramid-shaped.

12. The plastic frame as claimed in claim 11, the light guiding element further comprising an auxiliary element situated at the first end.

* * * * *